(12) United States Patent
Nguyen et al.

(10) Patent No.: US 9,197,548 B2
(45) Date of Patent: Nov. 24, 2015

(54) NETWORK SWITCHING SYSTEM USING SOFTWARE DEFINED NETWORKING APPLICATIONS

(75) Inventors: Cuong Nguyen, Austin, TX (US);
Rabah S. Hamdi, Spring, TX (US);
Joseph B. Farrell, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 483 days.

(21) Appl. No.: 13/586,550

(22) Filed: Aug. 15, 2012

(65) Prior Publication Data

US 2014/0052836 A1 Feb. 20, 2014

(51) Int. Cl.
*H04L 12/721* (2013.01)
*H04L 12/725* (2013.01)

(52) U.S. Cl.
CPC ............. *H04L 45/38* (2013.01); *H04L 45/306* (2013.01)

(58) Field of Classification Search
CPC ......... H04L 41/00; H04L 41/12; H04L 12/00; G06F 15/11; G06F 15/173
USPC ........................................................ 709/223
See application file for complete search history.

(56) References Cited

U.S. PATENT DOCUMENTS

| | | | |
|---|---|---|---|
| 6,249,820 B1* | 6/2001 | Dobbins et al. | 709/238 |
| 6,888,807 B2* | 5/2005 | Heller et al. | 370/328 |
| 8,837,288 B2 | 9/2014 | Hamdi et al. | |
| 2006/0037072 A1* | 2/2006 | Rao et al. | 726/14 |
| 2006/0271658 A1* | 11/2006 | Beliles et al. | 709/223 |
| 2009/0113517 A1* | 4/2009 | Engdahl et al. | 726/1 |
| 2011/0058549 A1 | 3/2011 | Harel et al. | |
| 2011/0216669 A1 | 9/2011 | Chawla et al. | |
| 2012/0110656 A1* | 5/2012 | Santos et al. | 726/13 |
| 2013/0329578 A1* | 12/2013 | Groves et al. | 370/252 |
| 2014/0003422 A1* | 1/2014 | Mogul et al. | 370/389 |
| 2014/0010083 A1* | 1/2014 | Hamdi et al. | 370/235 |
| 2014/0075519 A1* | 3/2014 | Porras et al. | 726/4 |

OTHER PUBLICATIONS

Rob Sherwood, Glen Gibb, Kok-Kiong Yap, Guido Appenzeller, Martin Casado, Nick McKeown and Guru Parulkar; "FlowVisor: A Network Virtualization Layer;" pp. 1-14; Deutsche Telekom Inc. R&D Lab; http://openflow.org.

(Continued)

*Primary Examiner* — Ebrahim Golabbakhsh
(74) *Attorney, Agent, or Firm* — Haynes and Boone, LLP (57) ABSTRACT

A network switching system includes a storage device including a plurality of application-provided flow-based rules provided by a plurality of applications. A packet processor is coupled to the storage device and includes a flow-based handler that is operable to receive a packet, determine that the packet is associated with a flow session, and associate a plurality of the application-provided flow-based rules with the packet based the association of the packet with the flow session. The packet processor also includes a flow-based rule processing engine that is operable to determine a priority for the plurality of application-provided flow-based rules and apply at least one of the plurality of application-provided flow-based rules to the packet according to the priority. The system allows a plurality of SDN applications to operate in a network switching system independently and without knowledge of each other.

20 Claims, 9 Drawing Sheets

(56) References Cited

OTHER PUBLICATIONS

Teemu Koponen, Martin Casado, Natasha Gude, Jeremy Stribling, Leon Poutievski, Min Zhu, Rajiv Ramanathan, Yuichiro Iwata, Hiroaki Inoue, Takayuki Hama and Scott Shenker; "ONIX: A Distributed Control Platform for Large-Scale Production Networks;" pp. 1-13; http://yuba.standford.edu/~casado/onix-osdi.pdf.

Martin Casado, David Erickson, Igor Anatolyevich Ganichev, Rean Griffith, Brandon Heller, Nick McKeown, Daekyeong Moon, Teemu Koponen, Scott Shenker and Kyriakos Zarifis; "Ripcord: A Modular Platform for Data Center Networking;" Jun. 7, 2010; pp. 1-13; Electrical Engineering and Computer Sciences, University of California and Berkeley; http://www.eecs.berkeley.edu/Pubs/TechRpts/2010/EECS-2010-93.pdf.

\* cited by examiner

NETWORK SWITCHING SYSTEM USING SOFTWARE DEFINED NETWORKING APPLICATIONS

BACKGROUND

The present disclosure relates generally to information handling systems (IHS's), and more particularly to a network switching IHS implementing software defined networking (SDN) applications for transferring information between IHS's.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventionally, the control of network switches and routers has been proprietary and determined by the manufacturers of the equipment. Software Defined Networking (SDN) seeks to change this by making the control plane (e.g., the information defining what to do with incoming packets such as, for example, the information in the routing table) remotely accessible and modifiable using SDN applications. SDN applications have been developed that can manage security policy, network load balancing, power, routing algorithms, packet modification and redirection, and/or a variety of other network criteria known in the art.

However, SDN applications expect to have full control over the incoming packets, which becomes a problem when multiple SDN applications are added to the system, and particularly when those SDN applications are provided by different vendors. For example, a first SDN application may be desirable for associating rules or actions with packets that provide for network load balancing, while a second SDN application may be desirable for associating rules or action with those packets that provide a security policy. In some situations, the rules or actions provided using the first SDN application will conflict with the rules or actions provided using the second SDN application, which can result in conflicting logic that creates unpredictable network behavior. The solution to this problem is to build an SDN application that perform all the functions needed by the system (e.g., an SDN application that provides for both network load balancing and security policy), and that SDN application may then be designed such that no rules or actions conflict. However, this solution makes it difficult to quickly and easily leverage new innovations in SDN because of the need to build a SDN application that provides all of the desired SDN functionality in a system in order to implement a new SDN functionality.

Accordingly, it would be desirable to provide an improved SDN network switching system.

SUMMARY

According to one embodiment, a network switching system includes a storage device including a plurality of application-provided flow-based rules provided by a plurality of applications; and a packet processor coupled to the storage device, wherein the packet processor includes: a flow-based handler that is operable to receive a packet, determine that the packet is associated with a flow session, associate a plurality of the application-provided flow-based rules with the packet based the association of the packet with the flow session; and a flow-based rule processing engine that is operable to determine a priority for the plurality of application-provided flow-based rules and apply at least one of the plurality of application-provided flow-based rules to the packet according to the priority.

BRIEF DESCRIPTION OF THE DRAWINGS

FIG. 8b is a schematic illustrating an embodiment of the operation of the method of FIG. 8a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
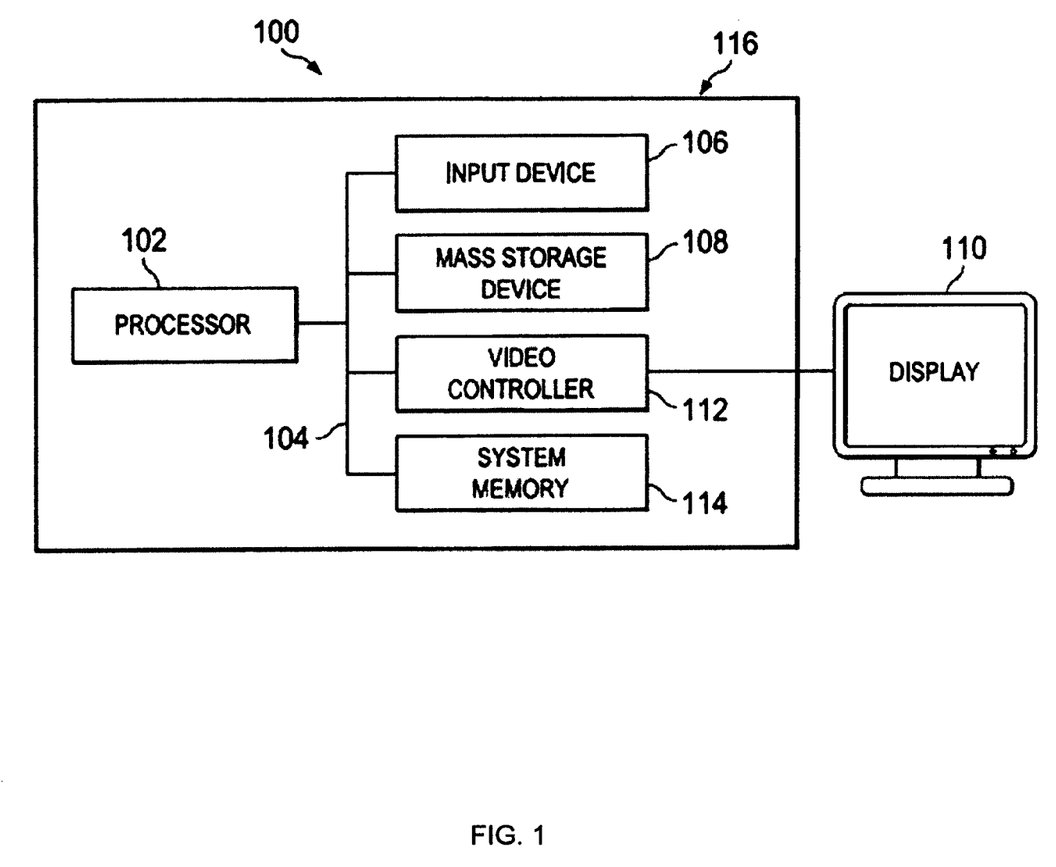
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Traditional packet processing logic in network switching devices includes two major components: a data plane or fast processing path where data packets are received, queued, processed, and then forwarded to the appropriate destination, and a control plane or slow processing path where communication protocols, configuration, and administration takes place. Data packets that transit the data plane or fast processing path are typically delay sensitive and processed with priority based on application and policy settings, while control packets that transit the control plane are relatively less delay sensitive and thus tolerant to longer latency. For example, control packets typically carry device control information or communication protocol data that allows devices to communicate packet forwarding logic with each other, routing and discovery protocol, data packets that requirement additional attention, processing configurations, device configurations, and/or a variety of other control packet information known in the art.

Figure 2:
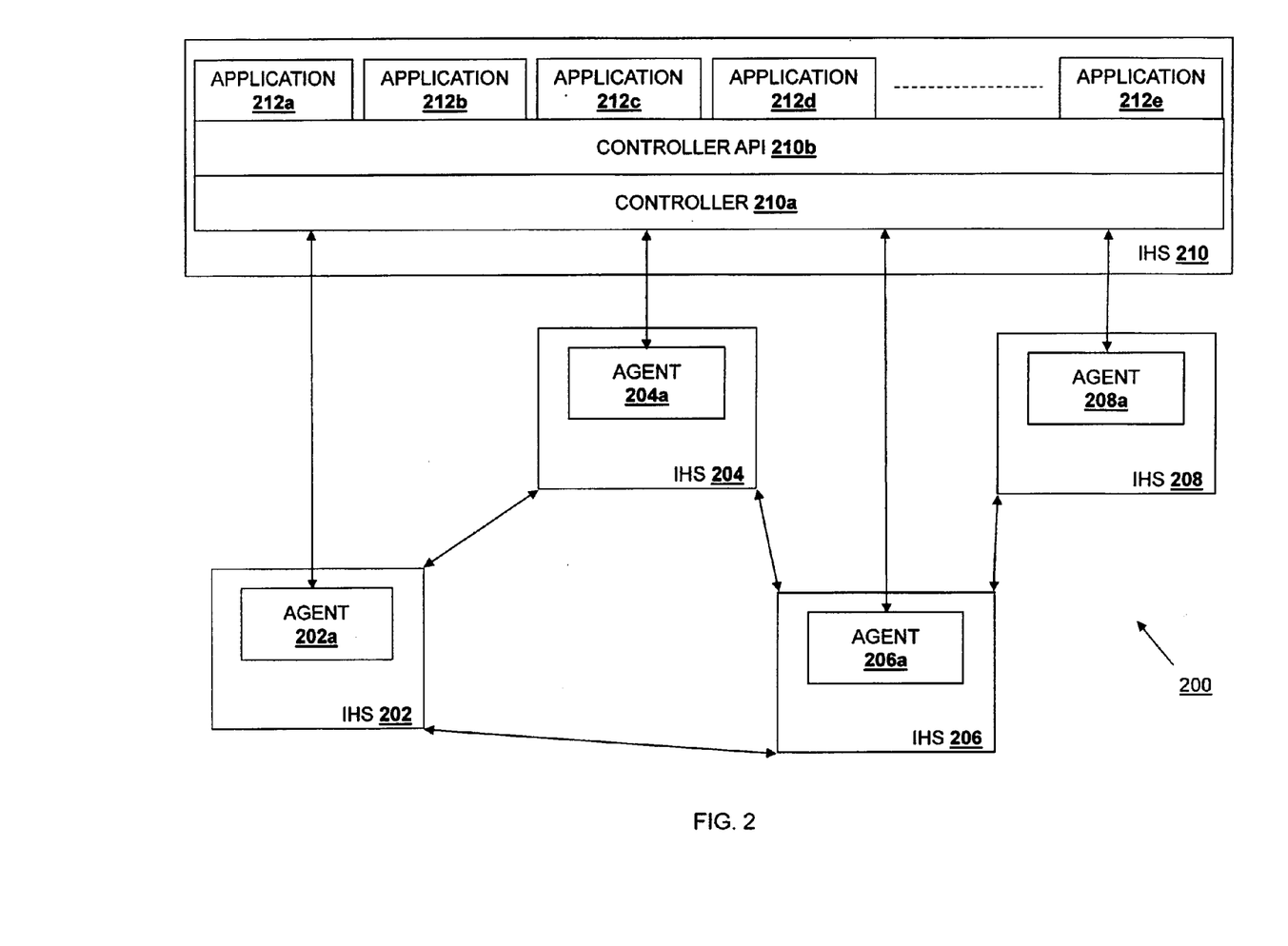
FIG. 2 is a schematic view illustrating an embodiment of a software defined networking framework including a plurality of software defined networking applications coupled to a plurality of network switching systems.

New communications protocols such as, for example, the OpenFlow communications protocol (www.openflow.org), separate the data plane and the control plane, with the data plane remaining on the networking device and the control plane (containing the routing protocol and forwarding logic) moved to a controller platform typically running on an IHS coupled to the networking device. FIG. 2 illustrates a software defined networking framework 200 including a plurality of network switching IHSs 202, 204, 206, and 208 each having a respective agent (e.g., an OpenFlow agent) 202*a*, 204*a*, 206*a*, and 208*a*. Each of the network switching IHSs 202, 204, 206, and 208 may be coupled to each other and a control IHS 210 such as, for example, a server. The illustrated embodiment, the network switching IHS 202 is coupled to the network switching IHSs 204 and 206 and the control IHS 210, the network switching IHS 204 is coupled to the network switching IHSs 202 and 206 and the control IHS 210, the network switching IHS 206 is coupled to the network switching IHSs 204, 206, and 208 and the control IHS 210, and the network switching IHS 208 is coupled to the network switching IHS 206 and the control IHS 210, although other connection schemes are possible.

The control IHS 210 includes a controller 210*a* (e.g., an OpenFlow controller), a controller Application Programming Interface (API) (e.g., an OpenFlow controller API) interfacing with the controller 210*a*, and a plurality of Software Defined Networking (SDN) applications 212*a*, 212*b*, 212*c*, 212*d*, and 212*e* interfacing with the controller API 210*b*. In an embodiment of the present disclosure, any two of the SDN applications 212*a*, 212*b*, 212*c*, 212*d*, and 212*e* may be provided by different SDN application providers (e.g., vendors) and are operable to operate independently from each other and without knowledge of each other, as described in further detail below. Each of the networking IHSs 202, 204, 206, and 208 include their respective agents 202*a*, 204*a*, 206*a*, and 208*a* for use in managing the flows seen by that networking IHS. The controller 210*a* is operable to configure the agents 202*a*, 204*a*, 206*a*, and 208*a* for flow matching rules, flow-based rules, and actions provided by the SDN applications 212*a*, 212*b*, 212*c*, 212*d*, and 212*e* for execution on one or more flows by configuring flow tables, flow rules, and actions in the networking IHSs 202, 204, 206, and 208. Thus, the controller 210*a* and controller API 210*b* provide the structure for which the SDN applications 212*a*, 212*b*, 212*c*, 212*d*, and 212*e* may interface with the rest of the networked system 200.

Any of the SDN applications 212*a*, 212*b*, 212*c*, 212*d*, and 212*e* may be a variety of SDN applications known in the art such as, for example, SDN applications for managing security policies, network load balancing, power, routing algorithms, packet modification and redirection, and/or a variety of other SDN application functions known in the art. As discussed in further detail below, each of the SDN applications 212*a*, 212*b*, 212*c*, 212*d*, and 212*e* is operable to create flow entries (e.g., flow-based rules) in flow tables in the networking IHSs 202, 204, 206, and 208 for matching packets to specific flows and, in response, associating actions with those packets.

Figure 3:
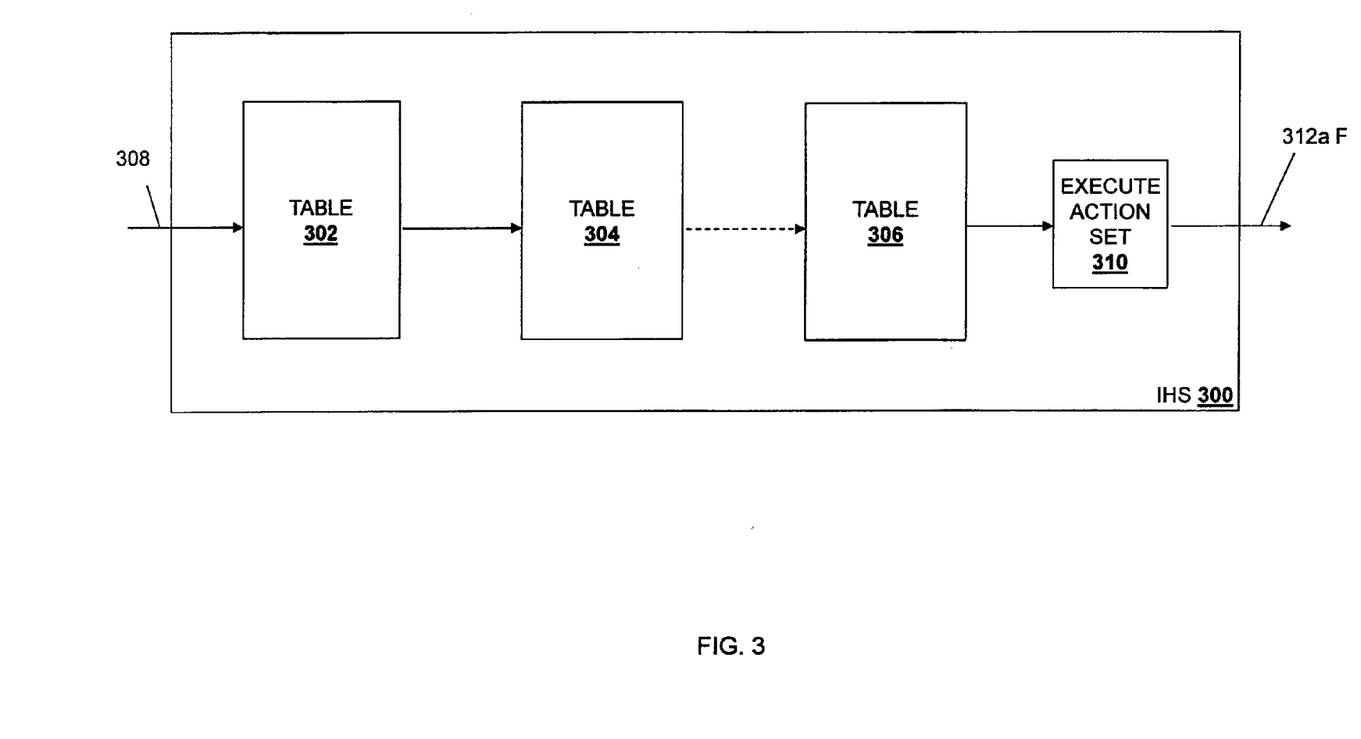
FIG. 3 is a schematic view illustrating an embodiment of a flow table pipeline in one of the network switching systems of FIG. 2.

FIG. 3 illustrates flow pipeline processing through an IHS 300, which may be any of the network switching IHSs 202, 204, 206, and/or 208 illustrated in FIG. 2. Flow processing may occur through a set of linked tables 302, 304, and 306 in the IHS 300 ("a flow table pipeline"). Each of the flow tables 302, 304, and 306 include flow entries provided by the SDN applications 212*a*, 212*b*, 212*c*, 212*d*, and 212*e*, and each flow entry may include a matching filter, counters for statistics, and one or more actions to be taken on a packet that satisfies the criteria in the matching filter. Packet processing by the IHS 300 begins with a packet entering the IHS 300 and the IHS 300 determining whether the packet matches any flow entries in the flow table 302. If the packet matches a flow entry in the flow table 302, an action associated with the entry may be associated with the packet. Actions may include dropping the packet, forwarding the packet, modifying and forwarding the packet, sending the packet to the next table for processing, and/or a variety of other flow processing actions known in the art. If the packet does not match a flow entry in the flow table 302, one or more user-defined actions may be performed on the flow. In an embodiment, any of the SDN applications 212*a*, 212*b*, 212*c*, 212*d*, and 212*e* may be designed to operate under the assumption that that SDN application has full control of the flow table pipeline. Thus, any of the SDN applications 212*a*, 212*b*, 212*c*, 212*d*, and 212*e* may use one or more of the flow tables 302, 304, and 306 independent of the other SDN applications, and the possibility of conflicting actions being associated with packets in a flow arises.

Figure 4:
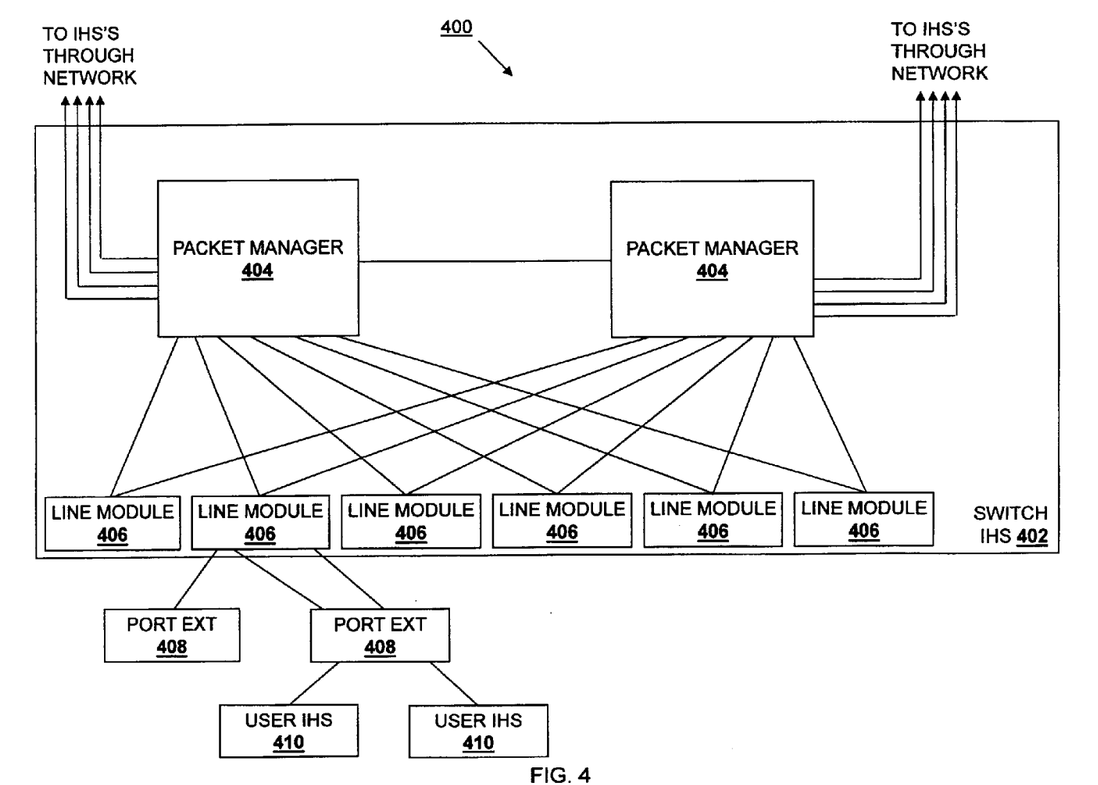
FIG. 4 is a schematic view illustrating an embodiment of an information handling system including a plurality of components that each may include the network switching system of the present disclosure.

Referring now to FIG. 4, an embodiment of an IHS network 400 is illustrated. The embodiment of the IHS network 400 illustrated in FIG. 4 is an example of a flow-based switching system including optimized fabric port extenders that may be tailored for flow-based switching. However, the example illustrated in FIG. 4 is simply one example of an IHS network that provides flow-based network switching system according to the teachings of the present disclosure, and one of skill in the art will recognize that the teachings below may be applied to a variety of different devices and systems without departing from the scope of the present disclosure. The IHS network 400 includes a switch IHS 402 having a plurality of packet managers 404 each connected to a plurality of line modules 406. As illustrated for one of the line modules 406, any of the line modules 406 may be connected to a plurality of port extenders 408. As illustrated for one of the port extenders 408, any of the port extenders 408 may be coupled to a plurality of user IHS's 410. As would be understood by one of skill in the art, the switch IHS may be connected to a core switch or router (not illustrated) that is further connected the Internet, a datacenter, etc.

Figure 5:
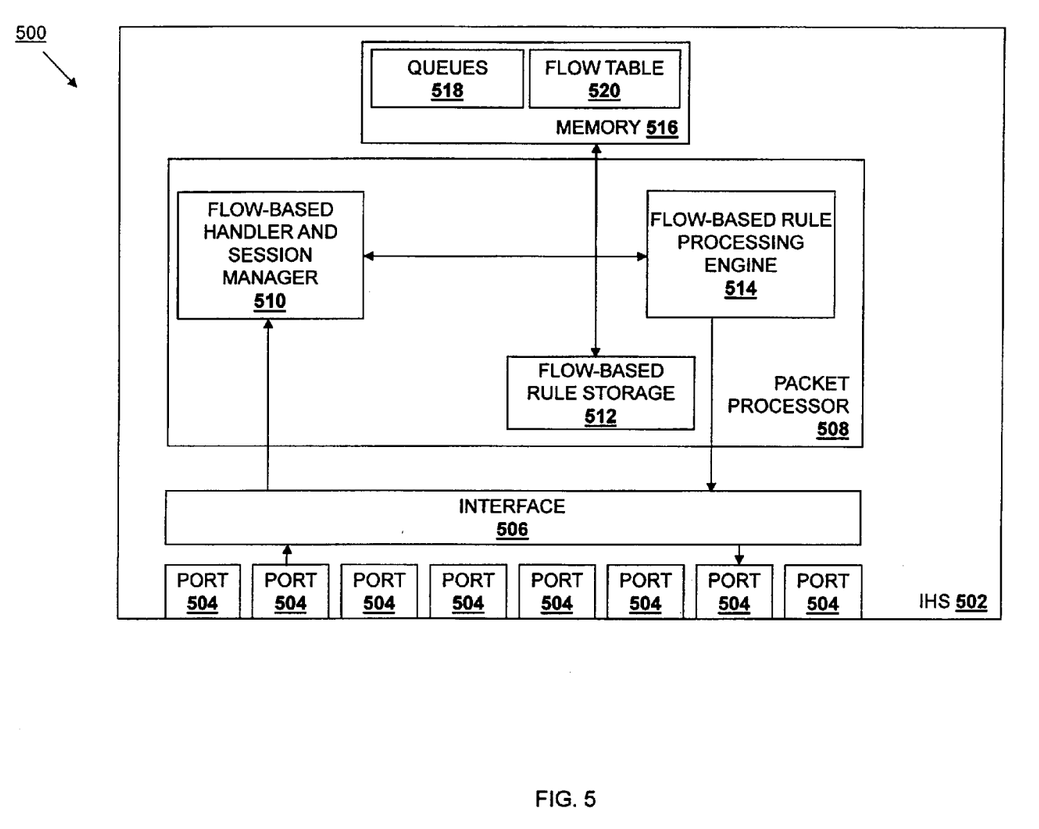
FIG. 5 is a schematic view illustrating an embodiment of a network switching system that may be used in the information handling system network of FIG. 4.

Referring now to FIG. 5, an embodiment of a flow-based network switching system 500 is illustrated. The flow-based network switching system 500 includes an IHS 502. In an embodiment, the IHS 502 may be the IHS 100, described above with reference to FIG. 1, may be included in the packet managers 404, the line modules 406, or the port extenders 408, described above with reference to FIG. 4, and/or may be provided in a variety of other network components known in the art. The IHS 502 includes a plurality of ports 504 that are each coupled to an interface 506 that may include, for example, a Media Interface with physical (PHY) and link (MAC) layers. The interface 506 couples the ports 504 to a packet processor 508 which, in an embodiment, may be a flow-based packet processing chip such as, for example, a chip that has been optimized to inspect and classify application layer packet information (as opposed to convention packet processing chips that process packets based on layer-2 and layer-3 data), as discussed further below. The packet processor 508 includes a flow-based handler and session manager 510, a flow-based rule processing engine 514, and a flow-based rule storage 512. Each of the flow-based handler and session manager 510 and the flow-based rule processing engine 514 are coupled to the interface 506. The flow-based handler and session manager 510, the flow-based rule processing engine 514, and the flow-based rule storage 512 are coupled to each other and to a memory 516. The flow-based rule storage 512 is configurable and programmable by a user to include a variety of flow-based rules, discussed in further detail below. Furthermore, the flow-based rule storage 512 may include one or more default rules that may be applied to packets that are not associated with any user defined flow set rules, discussed in further detail below. In an embodiment, the memory 516 is external to the packet processor 508 and coupled to at least one core of the packet processor 508 through a high speed memory bus. The memory 516 includes a plurality of queues 518 and a flow table 520.

Several embodiments of the operation of the system illustrated in FIGS. 4 and 5 are described in co-pending U.S. application Ser. No. 13/543,019, filed on Jul. 6, 2012, now U.S. Pat. No. 8,837,288 the disclosure of which is incorporated herein by reference. Those embodiments are generally directed to a flow-based networking system that assembles packets, retrieves application layer meta data from each of the packets, determines flow sessions associated with each of the packets using the application layer metadata, retrieves and applies flow-based rules for each of the packets using the application layer metadata, and forwards each of the packets. The details with respect to these embodiments need not be repeated here, but one of skill in the art will recognize that the association of packets with flow sessions and the association of flow-based rules with packets may be performed by the systems and methods of the present disclosure is substantially the same manner.

Figure 6:
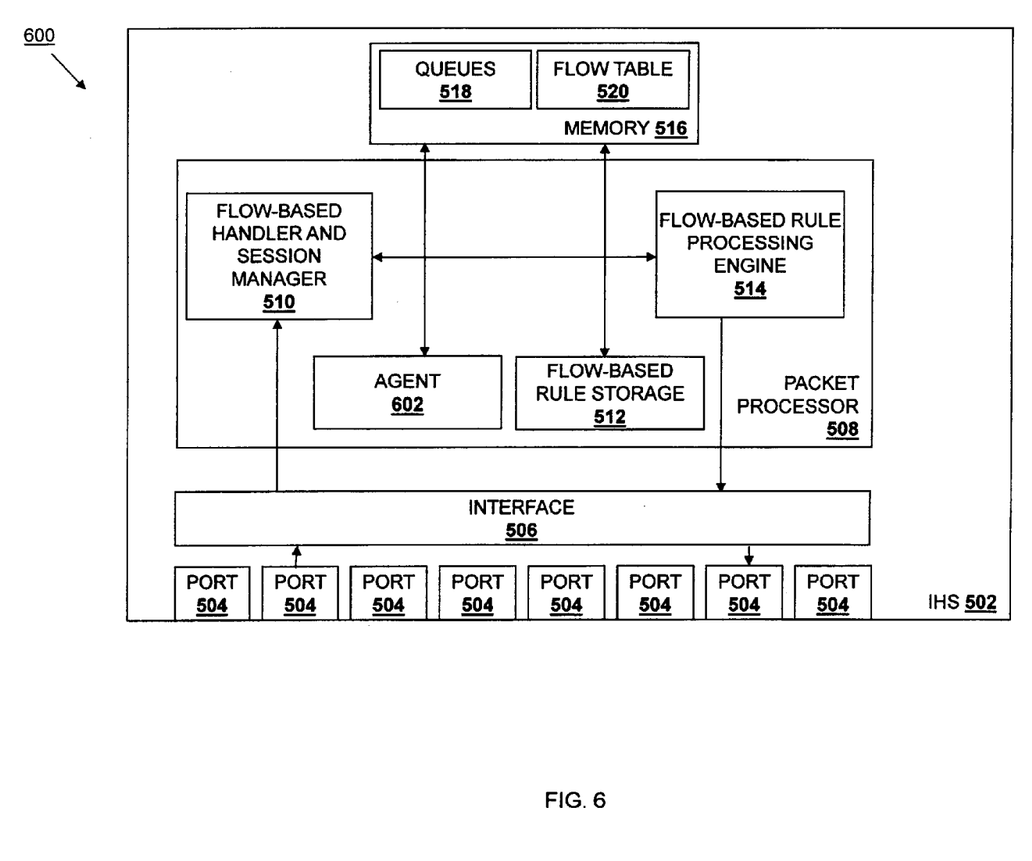
FIG. 6 is a schematic view illustrating an embodiment of the network switching system of FIG. 5 with an agent for use in managing flows.

FIG. 6 illustrates a network switching system 600 that that includes substantially similar components to the network switching system 500 of FIG. 5, but with the provision of an agent 602 (e.g., an OpenFlow agent) coupled to the flow-based session handler and session manager 510, the flow-based rule storage 512, the flow-based rule processing engine 514, and the memory 516. As discussed in further detail below, the networking switching system 600 provides for the coordination of flow-based rules provided by a plurality of different SDN applications to provide a predictable set of operations on packets in flows, preventing unpredicted outcomes and undesirable network behavior, without the need for each of the SDN applications to have knowledge of the other SDN applications acting in the system. Such a system enables the use of SDN applications, created independently and/or by different SDN application providers (e.g., vendors) to be implemented in the system without modification to those SDN applications.

As discussed in co-pending U.S. application Ser. No. 13/543,019, filed on Jul. 6, 2012, now U.S. Pat. No. 8,837,288 packets that ingress the network switching system 500 are matched to flows by the flow-based handler and session manager 510, followed by the association of flow-based rules or action rule sets (e.g., security, load balancing, traffic shaping, redirection, modification, statistics, packet header rewrites, etc.) with the packets based on their association with particular flows. The flow-based handler and session manager 510 is also operable to create flow sessions upon receiving the first packet associated with those flow sessions, and to monitor and maintain statistics on all active flow sessions. The flow-based rule processing engine 514 then applies the flow-based rules or action rule sets to the packets prior to flow scheduling and redirection to egress ports on the network switching system 500.

Figure 7:
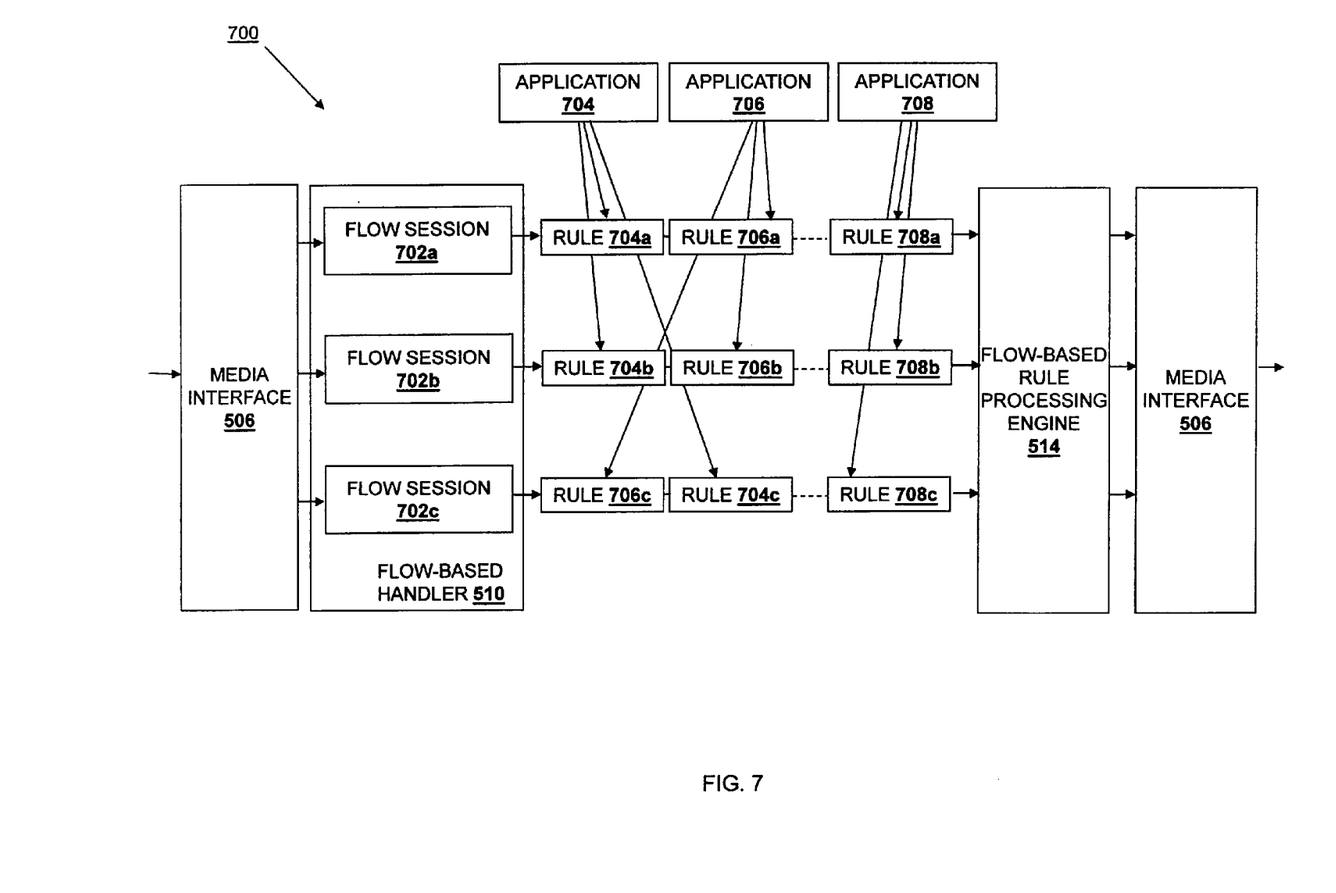
FIG. 7 is a schematic view illustrating an embodiment of the operation of the networking switching system of FIG. 6 in the software defined networking framework of FIG. 2.

The network switching system 600 provides the agent 602 for configuration by a controller (e.g., the controller 210a of FIG. 2) for flow matching rules and actions provided by a plurality of SDN applications (e.g., the SDN applications 212a, 212b, 212c, 212d, and 212e of FIG. 2), while the flow-based handler and session manager 510 and the flow-based rule processing engine 514 are used to associate and apply rules and actions, provided by different SDN application, to packets while avoiding conflicts that result in undesired network behavior. FIG. 7 illustrates the operation 700 of the network switching system 600 to associate rules with packets that are associated with different flow sessions. Packets enter the network switching system 600 through the media interface 506 and are determined to be associated with, or used to create, one or more flow sessions 702a, 702b, and 702c by the flow-based handler 510, which then monitors those flow sessions as discussed above.

Each of a plurality of SDN applications 704, 706, and 708 defines flow entries or flow-based rules for each flow session. For example, the SDN application 704 defines rule 704a for flow session 702a, rule 704b for flow session 702b, and rule 704c for flow session 702c; the SDN application 706 defines rule 706a for flow session 702a, rule 706b for flow session 702b, and rule 706c for flow session 702c; and the SDN application 704 defines rule 708a for flow session 702a, rule 708b for flow session 702b, and rule 708c for flow session 702c. The flow-based handler 510 is operable to determine that a packet is associated with a flow session, and then associate flow entries or flow-based rules in one or more flow tables in a flow table pipeline associated with that flow session. These operations by the flow-based handler 510 result in the building of flow-based rule pipelines for each flow session monitored by the flow-based handler 510. For example, in the illustrated embodiment, a first flow-based rule pipeline is associated with the flow session 702a and includes rules 704a, 706a, and 708a, a second flow-based rule pipeline is associated with the flow session 702b and includes rules 704b, 706b, and 708b, and a third flow-based rule pipeline is associated with the flow session 702c and includes rules 704c, 706c, and 708c.

The flow-based rule processing engine 514 is operable to apply the rules for each flow-based rule pipeline based on one or more priorities. Priorities may be based on actions taken according to a flow entry or flow-based rule, the SDN application that provided the rule, and/or a variety of other priority criteria known in the art. Furthermore, priorities may differ for a given flow-based rule depending on the flow to which it is applied. In the event of a conflict, the higher priority flow entry or flow-based rule may be applied while the lower priority and conflicting flow entry or flow-based rule may be ignored or modified such that the lower priority rule no longer conflicts with the higher priority rule. When all the flow entries or flow-based rules in a particular flow-based rule pipeline either have either been applied to a packet, conflicted out of application to the packet, or modified such that no conflict exists, the packet is passed from the flow-based rule processing engine 514 to the media interface 506 such that the packet may egress the system.

Figure 8A:
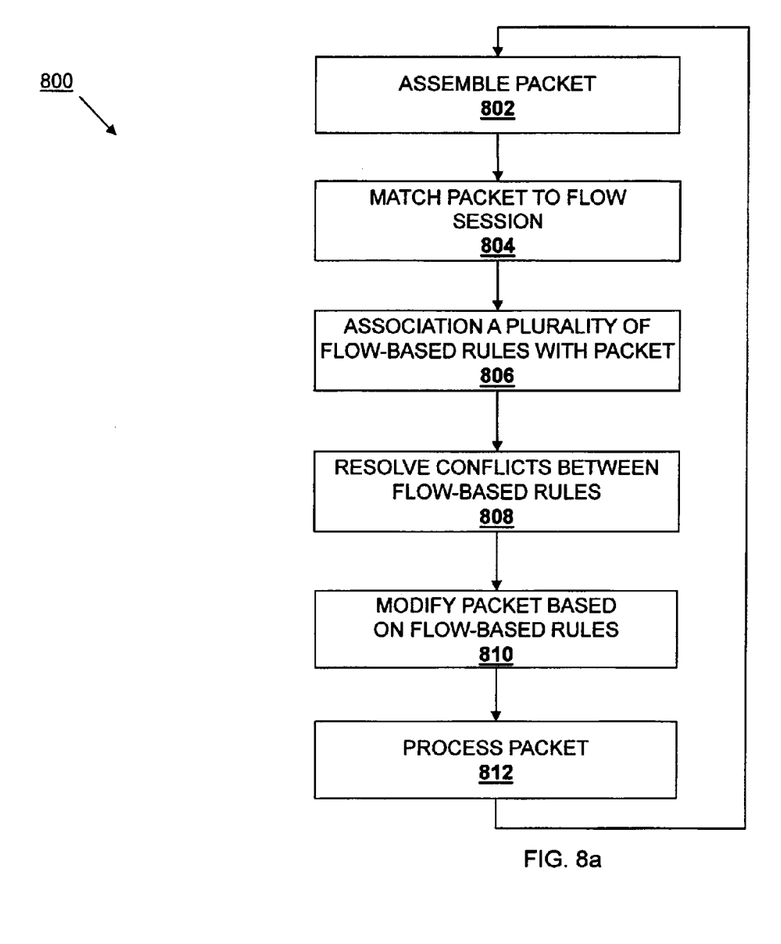
FIG. 8a is a flow chart illustrating an embodiment of a method for network switching.

Referring now to FIG. 8, an embodiment of a method 800 for processing packets is illustrated. The method 400 may be performed by the network switching system 600 according to the operation illustrated in FIG. 7, as implemented in the IHS network 200 of FIG. 2 (e.g., in the packet managers 204, line modules 206, and/or port extenders 208) and/or in a variety of other networking scenarios known in the art. The method 800 and flow-based architecture illustrated in FIG. 6 may be leveraged for access network designs, aggregation network designs, and a variety of other network designs known in the art. The flow based processing performed in the method 800 addresses next-generation network architecture that requires intensive and high performance packet processing of independently operating, content aware SDN applications and services at line rate speeds, while providing programmable deep packet inspection and classification of complex data types of flow-based services designed into emerging technologies (e.g., the OpenFlow protocol, L4-L7 protocols, security and filtering, traffic management, load balancing, rate shaping, and/or a variety of other emerging technologies known in the art.)

The method 800 begins at block 802 where a packet is assembled. As is known in the art, packets may be sent from one or more IHS's in a network to the IHS 502 (e.g., a first IHS may send a first set of packets to the IHS 502 over the network, a second IHS may send a second set of packets to the IHS 502 over the network, and so on.) In an embodiment, packet data ingresses the IHS 502 through one of the ports 504. That packet data passes through the interface 506 and to the flow-based handler and session manager 510 in the packet processor 508. The flow-based handler and session manager 510 receives the packet data and assembles the packet data into packets for further processing. Thus, the flow-based handler and session manager 510 may receive a first set of packet data and assemble a first packet from that packet data, receive a second set of packet data and assemble a second packet from that packet data, receive a third set of packet data and assemble a third packet from that packet data, and so on. As packets are assembled, they may be stored in the queues 518 of the memory 516 before or while being processed according the method 800.

The method 800 then proceeds to block 804 where the packet is matched to a flow session. Subsequent to assembling a packet in block 802 of the method 800, the flow-based handler and session manager 510 may perform a deep inspection on the packet header. Using the metadata from the deep inspection of the packet, the flow-based handler and session manager 510 then compares that metadata to flow match rules that are stored in the flow table 520 to determine whether the packet assembled in block 802 of the method 800 matches a flow session that is associated with one or more of the flow match rules that are stored in the flow table 520. The flow-based handler and session manager 510 may employ a variety of algorithms to determine whether the metadata from the packet is associated with a flow session such as, for example, retrieving application layer metadata such as signatures (e.g., URLs) from the packet header and matching that application layer metadata with flow match rule data for a flow session in the flow table. When the first packet associated with a particular flow is received, the flow-based handler and session manager 510 creates a flow session in response to determining that the packet metadata matches flow match rule data that is stored in the flow table 520 and that pertains to configurations and management associated with that flow session. Then, further packets associated with that particular flow session can then be determined to be part of that flow session by matching metadata retrieved through the deep packet inspection discussed above with the flow match rules data in the flow table 520.

In an embodiment of block 804, using the metadata retrieved through the deep packet inspection discussed above, the flow-based handler and session manager 510 may access the flow table 520 to determine whether any flow match rules exist for that packet. In one example, a first SDN application may provide a flow-based rule, discussed in further detail below, for security, while a second SDN application may provide a flow-based rule, discussed in further detail below, for network load balancing. A user of the flow-based network switching system 600 may pre-configure and program flow-based rules for packets into the flow-based rule storage 5312 for particular flows, and flow match rules associated with those particular flows are then stored in the flow table 520 and used to match packets to their appropriate flows such that the user defined flow-based rules may be applied.

Following block 804, the method 800 proceeds to block 806 where flow-based rules are associated with the packet. The flow-based handler and session manager 510 uses the metadata retrieved through the deep packet inspection discussed above to retrieve one or more flow-based rules from the flow-based rule storage 512 and associates the one or more flow-based rules with the packet. For example, the flow-based handler and session manager 510 may retrieve the SDN application-provided rules associated with security and network load balancing, and provide those rules in a flow-based rule pipeline that is associated with the packet. Flow-based rules associated with a packet in a flow-based rule pipeline may be provided to the flow-based rule processing engine 514 at block 806.

In an embodiment, the flow-based rules retrieved and associated with the packet in the flow-based rules pipeline at block 510 may include a security rule provided by an SDN application such as, for example, a rule for dropping packets belonging to a flow session that is accessing unauthorized websites. In an embodiment, the flow-based rules retrieved and associated with the packet in block 806 may include a load balancing rule provided by an SDN application such as, for example, a rule for directing packets in a flow session to a destination based on a network traffic design. In an embodiment, the flow-based rules retrieved and associated with the packet in block 806 may include a traffic shaping rule provided by an SDN application such as, for example, a rule for directing packets belonging to a flow session to maintain traffic speeds over one or more traffic interfaces. In an embodiment, the flow-based rules retrieved and associated with the packet in block 806 may include a redirection rule provided by an SDN application such as, for example, a rule for directing packets in a flow session to another network, application, etc. In an embodiment, the flow-based rules retrieved and associated with the packet in block 806 may include a modification rule provided by an SDN application such as, for an example, a rule to modify a packet belonging to a flow session based on any user requirement. In an embodiment, the flow-based rules retrieved and associated with the packet in block 806 may include a statistical rule provided by an SDN application such as, for example, a rule to direct packets in a flow session to maintain traffic statistics as desired. In an embodiment, the flow-based rules retrieved and associated with the packet in block 806 may include a packet header rewrite rule provided by an SDN application such as, for example, a rule to rewrite the destination of packets in a flow session as desired by the user.

The method 800 then proceeds to block 808 where conflicts between the flow based rules are resolved. The flow-based rule processing engine 514 receives the flow-based rule pipeline for the packet and applies one or more priorities to the flow-based rules in the flow-based rule pipeline to determine how the rules associated with the packet should be applied to the packet. As discussed above, some of the rules associated with the packet at block 806 may conflict with other rules associated with the packet at block 806, and the flow-based rule processing engine 514 determines which of the conflicting rules should be applied to the packet, and whether the conflicting rules that are of lower priority may be modified such that no conflict exits, or ignored if the conflict cannot be resolved. By using the flow-based rule processing engine 514 to resolve conflicts between flow-based rules in a flow-based rule pipeline that were provided by different SDN application, SDN applications may be added to the system at any time and without any knowledge of the existence and/or operation of other SDN applications in the system, as the each SDN application will be allowed to provide its flow entries or flow-based rules to flow tables for association with packets and all conflicts between any flow entries or flow-based rules will be resolved by the flow-based rule processing engine 514.

Conflicts may be resolved by prioritizing flow-based rules based on a variety of criteria. For example, SDN applications providing for security may have their flow-based rules prioritized over all other SDN applications in the system. In another example, flow-based rules that provide for traffic shaping such that minimum traffic speeds are maintained may be prioritized over flow-based rules that provide for redirection of packets to a particular network. Priorities for flow-based rules may be defined by the system, a network administrator, an IHS user, and/or a variety of other system entities known in the art.

Figure 8B:
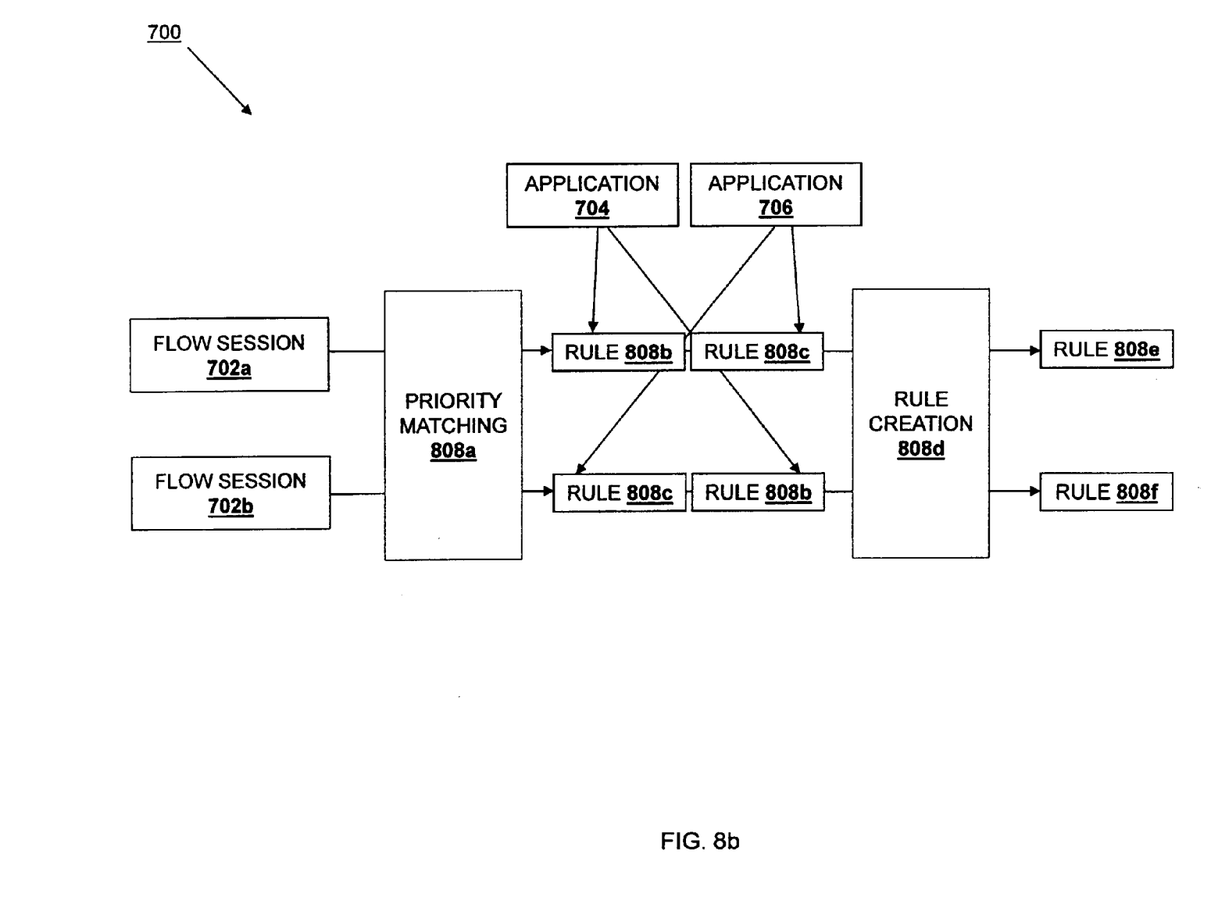

FIG. 8b illustrates an example of the performance of block 808 of the method 800 for two of the applications 704 and 706 with regard to two flow sessions, but one of skill in the art will appreciate that any number of applications providing flow-based rules for any number of flow sessions will fall within the scope of the present disclosure. As can be seen, for each flow session 702a and flow session 702b, the flow-based rule processing engine 514 is operable to perform priority matching 808a of rules from the applications 704 and 706 with the flow sessions 702a and 702b. In the illustrated example, application 704 includes a rule 808b that applies to the flow sessions 702a and 702b, while application 706 includes a rule 808c that applies to the flow sessions 702a and 702b as well. The prioritization for this example illustrates how different flows may prioritize rules differently (e.g., some flows may prioritize security rules while others may prioritize traffic redirection rules), with rule 808b from application 704 prioritized over rule 808c from application 706 for flow session 702a, and rule 808c from application 706 priotitized over rule 808b from application 704 for flow session 702b.

As can also be seen, for each flow session 702a and 702b that has had prioritized rules matched with it (808b and 808c with different priorities per flow session in the illustrated example), the flow-based rule processing engine 514 is operable to perform rule creation 808d using the rules matched to the flow session. As discussed above, the flow-based rule processing engine 514 is operable to determine whether the rules 808b and 808c conflict for each of the flows 702a and 702b, and then either modified the conflicting rule or ignore the conflicting rule such that a new rule created. In the illustrated embodiment, the rule 808e has been created from the matched and prioritized rules 808a and 808b for flow session 702a, and the rule 808f has been created from the matched and prioritized rules 808a and 808b for flow session 702b. In an embodiment, new rules may be created as a cross product that combines all rules matched and prioritized for a particular flow that do not conflict or have been modified to not conflict. For example, the user may create a profile or policy for the combining of rules based on flow requirements, application requirements, flow priorities, rule priorities, etc.

The method 400 then proceeds to block 810 where the packet is modified using the flow-based rules. The flow-based rule processing engine 514 uses the flow-based rules associated with the packet in block 806 that were not conflicted out in block 808 to modify the packet. For example, the packet may be modified according to the rules described above by changing any information in the packet header based on the requirements of the flow-based rule.

The method 800 then proceeds to block 812 where the packet is processed. In an embodiment, processing the packet may include performing flow scheduling (e.g., queueing the packet), forwarding the packet through the interface 506 such that the packet egresses the IHS 502 via one of the ports 504, dropping the packet, and/or a variety of other packet processing actions known in the art. In an embodiment, when packets associated with a flow session are scheduled for redirection and forwarding, the flow-based rule processing engine 514 also enforces the associated rules and policies on the packets as they progress into the egress pipeline of the IHS 502. Flow-based processing rules and policies may include conditional logic-based actions, byte swaps, field rewrite, increment/decrement operations, header insertion/deletion for tunnel creation/termination, traffic management, and load balancing.

The method 800 then returns to block 802 to where packets are assembled and the flow-based packet processing is repeated. One of skill in the art will recognize that the method 800 may be used by the flow-based network switching system to process, in parallel, sets of packets associated with different flow sessions. For example, a first set of packets associated with a first flow may be received and assembled, with a first flow session created upon receiving the first packet in the first set of packets, followed by modification of the packets in the first set of packets using the flow-based rules as discussed above before forwarding the packets in the first set of packets through the network. Concurrently, a second set of packets associated with a second flow may be received and assembled, with a second flow session created upon receiving the first packet in the second set of packets, followed by modification of the packets in the second set of packets using the flow-based rules as discussed above before forwarding the packets in the second set of packets through the network. This may occur for any number of flows occurring within the IHS network.

Thus, a flow-based network switching system and method have been described that provides for the processing of packets using a plurality of flow-based rules provided by a plurality of different SDN applications that operate independently from, and without knowledge of, each other. Each flow-based rules that is associated with a flow defined by a flow session is placed in a flow-based rule pipeline that is associated with the packet, and then priorities are applied to determine which of those flow-based rules to apply to the packet in the event two or more of the flow-based rules provide conflicting actions. The systems and methods of the present disclosure allow new SDN functions to be quickly adopted and utilized by allowing an SDN application that provides that SDN function to be integrated into a system without the need to worry about possible conflicts between that SDN application and existing SDN applications in the system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network switching system, comprising:
   a storage device including a plurality of application-provided flow-based rules provided by a plurality of applications; and
   a packet processor coupled to the storage device, wherein the packet processor includes:
      a flow-based handler that is configured to receive a packet, determine that the packet is associated with a flow session, and associate a plurality of the application-provided flow-based rules with the packet based the association of the packet with the flow session; and
      a flow-based rule processing engine that is configured to determine a priority for the plurality of application-provided flow-based rules that are associated with the packet, determine a conflict with the plurality of application-provided flow-based rules that are associated with the packet, and apply at least two of the plurality of application-provided flow-based rules to the packet according to the priority such that the conflict is resolved.

2. The system of claim 1, wherein the applying the at least two of the plurality of application-provided flow-based rules to the packet according to the priority such that the conflict is resolved includes modifying at least one lower priority of the at least two of the plurality of application-provided flow-based rules such that conflict is resolved when the at least one lower priority of the plurality of application-provided flow-based rules is applied to the packet along with the others of the at least two of the plurality of application-provided flow-based rules.

3. The system of claim 1, where the plurality of applications include a plurality of software defined networking applications that include at least one of a security application, a packet modification application, and a traffic redirection application.

4. The system of claim 1, wherein the priority for the application-provided flow-based rules is based on which of the plurality of applications provided each application-provided flow-based rule.

5. The system of claim 1, wherein the priority for the application-provided flow-based rules is based on an action required by each application-provided flow-based rule.

6. The system of claim 1, wherein each of the plurality of applications defines at least one application-provided flow-based rule for each of a plurality of flow sessions that are determinable by the flow-based handler to be associated with the packet.

7. The system of claim 1, wherein each of the plurality of applications are configured to run independently and without knowledge of the other of the plurality of applications.

8. An information handling system (IHS) network, comprising:
   a control IHS that includes a plurality of application that each provide at least one flow-based rule;
   a first IHS coupled to the network, wherein the first IHS is to generate and send a plurality of packets over the network; and
   a second IHS coupled to the control IHS and the first IHS through the network and including a storage device storing a plurality of the flow-based rules provided by the plurality of applications, wherein the second IHS is to:
      assemble the plurality of packets received from the first IHS;
      determine that a flow session is associated with each of the plurality of packets;
      associate a plurality of the flow-based rules provided by the plurality of applications with each of the plurality of packets based on the association of that packet and the flow session;
      for each of the plurality of packets, determine a priority for the plurality of flow-based rules that are associated with that packet; and
      for each of the plurality of packets, determine a conflict with the plurality of flow-based rules that are associated with the packet, and apply at least two of the plurality of flow-based rules to that packet based on the priority such that the conflict is resolved.

9. The IHS of claim 8, wherein the applying the at least two of the plurality of flow-based rules to the packet according to the priority such that the conflict is resolved includes modifying at least one lower priority of the at least two of the plurality of flow-based rules such that conflict is resolved when the at least one lower priority of the plurality of flow-based rules is applied to the packet along with the others of the at least two of the plurality of flow-based rules.

10. The IHS of claim 8, wherein the plurality of applications include a plurality of software defined networking applications that include at least one of a security application, a packet modification application, and a traffic redirection application.

11. The IHS of claim 8, wherein, for each of the plurality of packets, the priority for the flow-based rules is based on which of the plurality of applications defined each flow-based rule.

12. The IHS of claim 8, wherein, for each of the plurality of packets, the priority for the flow-based rules is based on an action required by each flow-based rule.

13. The IHS of claim 8, wherein each of the plurality of applications defines at least one flow-based rule for each of a plurality of flow sessions that are determinable to be associated with any of the plurality of packets.

14. The IHS of claim 8, wherein each of the plurality of applications are configured to run independently and without knowledge of the other of the plurality of applications.

15. A method for processing packets, comprising:
assembling a packet received from an IHS over a network;
determining that a flow session is associated with the packet; and
associating a plurality of flow-based rules defined by a plurality of applications with the packet based on the association of the packet and the flow session;
determining a priority for the plurality of flow-based rules that are associated with the packet;
determining a conflict with the plurality of flow-based rules that are associated with the packet; and
applying at least two of the plurality of flow-based rules to the packet based on the priority such that the conflict is resolved.

16. The method of claim 15, wherein the applying the at least two of the plurality of flow-based rules to the packet according to the priority such that the conflict is resolved includes:
modifying at least one lower priority of the at least two of the plurality of flow-based rules such that conflict is resolved when the at least one lower priority of the plurality of flow-based rules is applied to the packet along with the others of the at least two of the plurality of flow-based rules.

17. The method of claim 15, wherein the priority for the flow-based rules is based on which of the plurality of applications defined each flow-based rule.

18. The method of claim 15, wherein the priority for the flow-based rules is based on an action required by each flow-based rule.

19. The method of claim 15, wherein each of the plurality of applications defines at least one flow-based rule for each of a plurality of flow sessions that are determinable to be associated with the packet.

20. The method of claim 15, wherein each of the plurality of applications are configured to run independently and without knowledge of the other of the plurality of applications.

* * * * *